(12) United States Patent
Lin

(10) Patent No.: US 11,197,274 B2
(45) Date of Patent: Dec. 7, 2021

(54) UPLINK CONTROL INFORMATION TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/343,281

(22) PCT Filed: Nov. 3, 2016

(86) PCT No.: PCT/CN2016/104474
§ 371 (c)(1),
(2) Date: Apr. 18, 2019

(87) PCT Pub. No.: WO2018/081989
PCT Pub. Date: May 11, 2018

(65) Prior Publication Data
US 2019/0261355 A1  Aug. 22, 2019

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1887* (2013.01); *H04L 1/1893* (2013.01);
(Continued)

(58) Field of Classification Search
CPC ......... H04W 72/0413; H04W 72/1257; H04W 72/1268; H04W 72/14; H04W 72/0446;
(Continued)

(56) References Cited

U.S. PATENT DOCUMENTS

| 8,228,850 B2 | 7/2012 | McBeath |
| 8,634,398 B2 | 1/2014 | Nam |

(Continued)

FOREIGN PATENT DOCUMENTS

| CN | 102075309 A | 5/2011 |
| CN | 102238747 A | 11/2011 |

(Continued)

OTHER PUBLICATIONS

International Search Report in International application No. PCT/CN2016/104474, dated Jul. 21, 2017.
(Continued)

*Primary Examiner* — Brenda H Pham
(74) *Attorney, Agent, or Firm* — Ladas & Parry LLP

(57) ABSTRACT

Embodiments of the present invention provide an uplink control information transmission method, a terminal device, and a network device. The method comprises: a terminal device determines multiple uplink control channel units for transmitting target uplink control information, the multiple uplink control channel units being located in a same target time unit in a time domain, and each of the multiple uplink control channel units capable of separately transmitting the uplink control information; and in the target time unit, the terminal device sends the target uplink control information to a network device by means of the multiple uplink control channel units. By means of the embodiments of the present invention, the flexibility of the uplink control information can be improved.

22 Claims, 3 Drawing Sheets

(51) Int. Cl.
  *H04L 5/00* (2006.01)
  *H04W 72/12* (2009.01)
  *H04W 72/14* (2009.01)
  *H04W 80/00* (2009.01)
(52) U.S. Cl.
  CPC .......... *H04L 5/0007* (2013.01); *H04L 5/0055* (2013.01); *H04W 72/1257* (2013.01); *H04W 72/1268* (2013.01); *H04W 72/14* (2013.01); *H04W 72/0406* (2013.01); *H04W 72/0446* (2013.01); *H04W 72/1284* (2013.01); *H04W 80/00* (2013.01)
(58) Field of Classification Search
  CPC ............. H04W 80/00; H04W 72/0406; H04W 72/1284; H04L 1/1887; H04L 1/1893; H04L 5/0007; H04L 5/0055
  See application file for complete search history.

(56) References Cited

U.S. PATENT DOCUMENTS

| | | | |
|---|---|---|---|
| 9,337,984 B2 | 5/2016 | Kim | |
| 2009/0109914 A1 | 4/2009 | McBeath | |
| 2010/0291937 A1 | 11/2010 | Hu | |
| 2011/0141928 A1* | 6/2011 | Shin | H04L 5/0053 370/252 |
| 2011/0310823 A1 | 12/2011 | Nam | |
| 2012/0039275 A1* | 2/2012 | Chen | H04L 5/001 370/329 |
| 2012/0113827 A1* | 5/2012 | Yamada | H04W 36/06 370/252 |
| 2013/0083741 A1 | 4/2013 | Larsson | |
| 2014/0098780 A1* | 4/2014 | Kim | H04L 5/0055 370/329 |
| 2014/0219202 A1 | 8/2014 | Kim | |
| 2016/0226645 A1 | 8/2016 | Kim et al. | |

FOREIGN PATENT DOCUMENTS

| | | |
|---|---|---|
| CN | 102461044 A | 5/2012 |
| CN | 103098406 A | 9/2013 |
| CN | 103384183 A | 11/2013 |
| CN | 103814541 A | 5/2014 |
| CN | 104754742 A | 7/2015 |
| CN | 106059726 A | 10/2016 |
| RU | 2497288 C2 | 10/2013 |
| WO | 2009059547 A1 | 5/2009 |
| WO | 2011135916 A1 | 11/2011 |

OTHER PUBLICATIONS

Written Opinion of the International Search Authority in International application No. PCT/CN2016/104474, dated Jul. 21, 2017.
Notice of Allowance in corresponding Russian application No. 2019116255, dated Jan. 30, 2020.
First Office Action in corresponding Chilean application No. 201901176, dated Feb. 28, 2020.
First Office Action in corresponding Chinese application No. 201680089792.1, dated Apr. 17, 2020.
Suppementary European Search Report in the European application No. 16920857.6, dated Aug. 2, 2019.
English translation of the Written Opinion of the International Search Authority in the international application No. PCT/CN2016/104474, dated Jul. 21, 2017.
Written Opinion of the Singaporean application No. 11201903168S, dated May 16, 2020.
Intel Corporation, "UCI contents and UL control channel formats", 3GPP TSG-RAN WG1 #86bis R1-1609536, Oct. 10, 2016, chapter 3, 4.
NTT COCOMO, INC. "UL control channel for NR", 3GPP TSG RAN WG1 Meeting #87 R1-1612718, Nov. 14, 2016, entire document.
Nokia, Alcatel-Lucent Shanghai Bell, "On the PUCCH structure for NR", 3GPP TSG-RAN WG1 #87 R1-1612238, Nov. 14, 2016, entire document.
Intel Corporation, "UCI contents and UL control channel formats", 3GPP TSG-RAN WG1 #87 R1-1611993, Nov. 14, 2016, entire document.
Samsung, "UL Control Channel Design", 3GPP TSG RAN WG1 #87 R1-162529, Nov. 14, 2016, entire document.
NTT DOCOMO, Inc. "Initial views on UL control channel design", 3GPP TSG RAN WG1 Meeting #86bis R1-1610083, Oct. 1, 2016.
CATT: "NR UL Control Channel Design Considerations", 3GPP Draft; R1-1608792, 3rd Generation Partnership Project(3GPP), Mobile Competence Centre; 460, Route Des Lucioles; F-04921 Sophia-Antipolis Cedex; France vol. RAN WG1, No. Lisbon, Portugal; Oct. 10, 2016-Oct. 14, 2016 Oct. 9, 2016 (Oct. 9, 2016), XP051146847, Retrieved from the Internet: URL:http:/www.3gpp.org/ftp/Meetings_3GPP_SYNC/RAN1/Docs/ [retrieved on Oct. 9, 2016].
First Office Action of the Brazilian application No. BR1120190085386, dated Sep. 1, 2020.
First Office Action of the European application No. 16920857.6, dated Oct. 14, 2020.
First Office Action of the Japanese application No. 2019-520443, dated Nov. 27, 2020.
First Office Action of the Indian application No. 2019019585, dated Jan. 29, 2021.
First Office Action of the Israeli application No. 265901, dated Dec. 6, 2020.
Office Action of the Australian application No. 2016428422, dated Aug. 17, 2021.
Second Office Action of the Japanese application No. 2019-520443, dated Aug. 20, 2021.
First Office Action of the Taiwanese application No. 106137657, dated Aug. 10, 2021.
First Office Action of the Chinese Application No. 202011063227.2, dated Sep. 28, 2021.

* cited by examiner

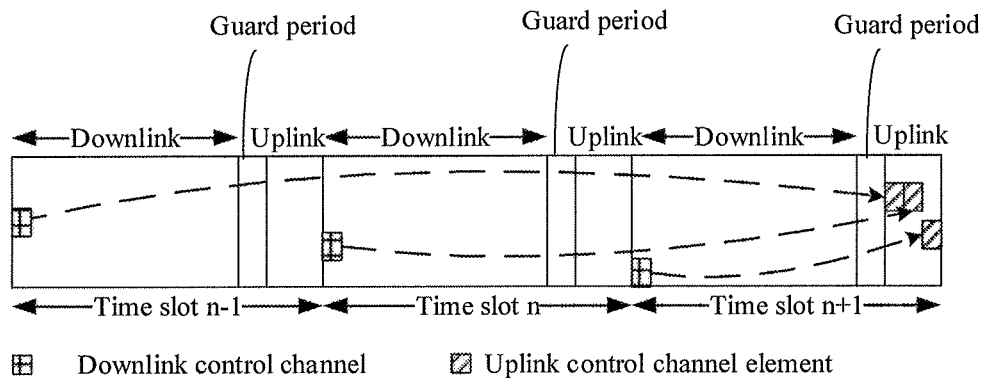
FIG. 2b
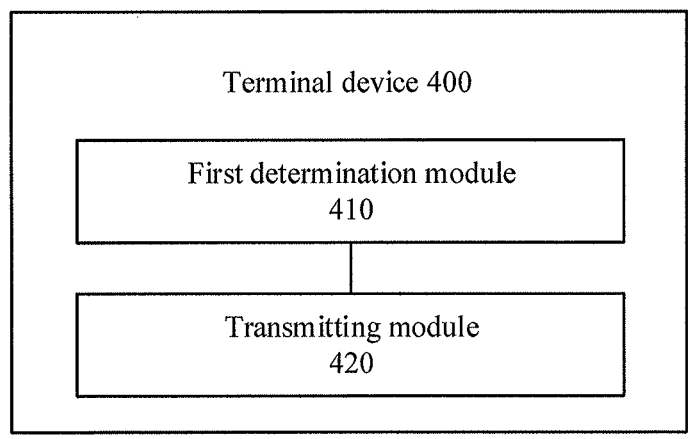
FIG. 3
FIG. 4

UPLINK CONTROL INFORMATION TRANSMISSION METHOD, TERMINAL DEVICE, AND NETWORK DEVICE

RELATED APPLICATION

This application is an application under 35 U.S.C. 371 of International Application No. PCT/CN2016/104474 filed on Nov. 3, 2016, the entire contents of which are incorporated herein by reference.

TECHNICAL FIELD

Embodiments of the disclosure relate to the field of communication, and more particularly, to a method for uplink control information transmission, a terminal device and a network device.

BACKGROUND

A future communication system, for example, a 5th-Generation (5G) system (or called a 5G New Radio (NR) system) supports dynamic downlink Hybrid Automatic Repeat reQuest (HARQ) timing determination, flexible subframe structure, carrier aggregation and massive antenna technologies and the like. Introduction of these technologies may cause a relatively great difference between the bit numbers of uplink control information transmitted by a terminal device in different time units (for example, different time slots).

Multiple uplink control channel formats are defined in the existing protocol, and different uplink control channel formats have different uplink control information capacities to support transmission of uplink control information of different capacities. In practical use, a terminal device may select, from multiple predefined uplink control channel formats, an uplink control channel format matched with a capacity of uplink control information to be transmitted, and transmit the uplink control information in the uplink control channel format.

The uplink control information transmission manner according to the existing protocol is not flexible and unsuitable for a communication system, in which bit numbers of uplink control information vary greatly.

SUMMARY

The embodiments of the disclosure provide a method for uplink control information transmission, a terminal device and a network device, so as to improve transmission flexibility of uplink control information.

A first aspect provides a method for uplink control information transmission, which may include that, a terminal device determines multiple uplink control channel elements for transmitting target uplink control information. The multiple uplink control channel elements are within the same target time unit in time domain and each of the multiple uplink control channel elements may be capable of independently transmitting the uplink control information; and the terminal device transmits, in the target time unit, the target uplink control information to a network device through the multiple uplink control channel elements.

In combination with the first aspect, in some implementation modes of the first aspect, a length of time-domain resources occupied by an uplink control channel element may be equal to a length of time-domain resources occupied by a number A of Orthogonal Frequency Division Multiplexing (OFDM) symbols, and a length of frequency-domain resources occupied by the uplink control channel element may be equal to a length of frequency-domain resources occupied by A number B of Resource Blocks (RBs), both of A and B being positive integers greater than or equal to 1.

In combination with the first aspect, in some implementation modes of the first aspect, the method may further include that, the terminal device determines the length of the time-domain resources and/or frequency-domain resources occupied by the uplink control channel elements according to a rule specified by a protocol.

In combination with the first aspect, in some implementation modes of the first aspect, the method may further include that, the terminal device determines the length of the time-domain resources and/or frequency-domain resources occupied by the uplink control channel elements according to signaling transmitted by the network device.

In combination with the first aspect, in some implementation modes of the first aspect, the maximum bit number of uplink control information which can be transmitted by one uplink control channel element may be N, and a value of N may be set in one of the following manners: setting the value of N to be 2; the value of N is set to be equal to a preset maximum bit number of Acknowledgment (ACK)/Negative Acknowledgment (NACK) information corresponding to downlink data transmitted in a time unit; and the value of N is configured by the network device.

In combination with the first aspect, in some implementation modes of the first aspect, the operation that the terminal device determines the multiple uplink control channel elements for transmitting the target uplink control information may include that, the terminal device receives multiple pieces of downlink data, each of the multiple pieces of downlink data corresponding to independent ACK/NACK information and the target uplink control information including the ACK/NACK information of the multiple pieces of downlink data; and for each of the multiple pieces of downlink data, the terminal device determines one or more corresponding uplink control channel elements, to obtain the multiple uplink control channel elements.

In combination with the first aspect, in some implementation modes of the first aspect, each of the multiple pieces of downlink data may correspond to at least one of the multiple uplink control channel elements, each of the multiple uplink control channel elements being configured to transmit the ACK/NACK information of the downlink data corresponding to the uplink control channel element.

In combination with the first aspect, in some implementation modes of the first aspect, the method may further include that, the terminal device determines a number of uplink control channel elements required for transmission of the target uplink control information according to the bit number of the target uplink control information and the maximum bit number of the uplink control information which can be transmitted by one uplink control channel element.

In combination with the first aspect, in some implementation modes of the first aspect, the operation that the terminal device determines the number of the uplink control channel elements required for transmission of the target uplink control information according to the bit number of the target uplink control information and the maximum bit number of the uplink control information which can be transmitted by one uplink control channel element may include that, the terminal device determines the number of the uplink control channel elements required for transmission of the target uplink control information according to K·⌈M/N⌉, where M may represent the bit number of the target uplink control information, N may represent the maximum bit number of the uplink control information which can be transmitted by one uplink control channel element and K may be a positive integer greater than or equal to 1.

In combination with the first aspect, in some implementation modes of the first aspect, the method may further include that, the terminal device receives indication information transmitted by the network device, the indication information including information for determining the resources occupied by the multiple uplink control channel elements; and the terminal device determines the resources occupied by the multiple uplink control channel elements according to the indication information.

In combination with the first aspect, in some implementation modes of the first aspect, the indication information may be Downlink Control Information (DCI).

In combination with the first aspect, in some implementation modes of the first aspect, the method may further include that, the terminal device determines a resource occupied by a first uplink control channel element in the multiple uplink control channel elements; and the terminal device determines resources occupied by the other uplink control channel elements, except the first uplink control channel element, in the multiple uplink control channel elements according to the resource occupied by the first uplink control channel element.

In combination with the first aspect, in some implementation modes of the first aspect, the operation that the terminal device determines the resources occupied by the other uplink control channel elements, except the first uplink control channel element, in the multiple uplink control channel elements according to the resource occupied by the first uplink control channel element may include that, the terminal device determines serial numbers of the resources occupied by the other uplink control channel elements according to a serial number of the resource occupied by the first uplink control channel element; and the terminal device determines the resources occupied by the other uplink control channel elements according to the serial numbers of the resources occupied by the other uplink control channel elements.

In combination with the first aspect, in some implementation modes of the first aspect, the operation that the terminal device determines the resources occupied by the other uplink control channel elements according to the serial numbers of the resources occupied by the other uplink control channel elements may include that, the terminal device determines the serial numbers of the resources occupied by the other uplink control channel elements according to the serial number of the resource occupied by the first uplink control channel element and a predefined function; or, the terminal device determines the serial numbers of the resources occupied by the other uplink control channel elements according to the serial number of the resource occupied by the first uplink control channel element and a preset offset; or, the terminal device determines the serial numbers of the resources occupied by the other uplink control channel elements according to the serial number of the resource occupied by the first uplink control channel element and HARQ timing of the other downlink data, the multiple uplink control channel elements being configured to transmit the ACK/NACK information of the multiple pieces of downlink data respectively and the other downlink data being the downlink data, except the downlink data corresponding to the first uplink control channel element, in the multiple pieces of downlink data; or, the terminal device determines the serial numbers of the resources occupied by the other uplink control channel elements according to the serial number of the resource occupied by the first uplink control channel element, and sequence numbers of time units where the other downlink data are located and/or sequence numbers of carriers where the other downlink data are located, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data; or, the terminal device determines the serial numbers of the resources occupied by the other uplink control channel elements according to the serial number of the resource occupied by the first uplink control channel element and serial numbers of the other downlink data, the multiple uplink control channel elements being configured to transmit the ACK/NACK information of the multiple pieces of downlink data respectively and the other downlink data being the downlink data, except the downlink data corresponding to the first uplink control channel element, in the multiple pieces of downlink data; or, the terminal device determines the serial numbers of the resources occupied by the other uplink control channel elements according to the serial number of the resource occupied by the first uplink control channel element and serial numbers of Transport Blocks (TBs) or coding blocks carried in the other downlink data, the multiple uplink control channel elements being configured to transmit the ACK/NACK information of the multiple pieces of downlink data respectively and the downlink data being the downlink data, except the downlink data corresponding to the first uplink control channel element, in the multiple pieces of downlink data.

In combination with the first aspect, in some implementation modes of the first aspect, the resources occupied by the other uplink control channel elements may be at least partially the same as the resource occupied by the first uplink control channel element.

In combination with the first aspect, in some implementation modes of the first aspect, the operation that the terminal device determines the resource occupied by the first uplink control channel element in the multiple uplink control channel elements may include that, the terminal device determines the resource occupied by the first uplink control channel element according to the signaling transmitted by the network device; or, the terminal device determines the resource occupied by the first uplink control channel element according to a Radio Network Temporary Identity (RNTI) of the terminal device or an Identity (ID) of the terminal; or, the terminal device determines the resource occupied by the first uplink control channel element according to a serial number of a physical resource occupied by a downlink control channel corresponding to the first uplink control channel element.

In combination with the first aspect, in some implementation modes of the first aspect, the resource occupied by an uplink control channel element may include at least one of a time-domain resource, a frequency-domain resource, or a code-domain resource.

In combination with the first aspect, in some implementation modes of the first aspect, the multiple uplink control channel elements may be used to repeatedly transmit the target uplink control information.

In combination with the first aspect, in some implementation modes of the first aspect, the multiple uplink control channel elements may be used together to transmit the target uplink control information, and different uplink control channel elements in the multiple uplink control channel elements may be used to transmit different information in the target uplink control information.

In combination with the first aspect, in some implementation modes of the first aspect, the time unit may be a time slot.

A second aspect provides a method for uplink control information transmission, which may include that, a network device determines multiple uplink control channel elements for transmitting target uplink control information. The multiple uplink control channel elements are within in the same target time unit in time domain, and each of the multiple uplink control channel elements may be capable of independently transmitting uplink control information. And the network device receives, in the target time unit, the target uplink control information transmitted by a terminal device through the multiple uplink control channel elements.

In combination with the second aspect, in some implementation modes of the second aspect, a length of time-domain resources occupied by an uplink control channel element may be equal to a length of time-domain resources occupied by a number A of OFDM symbols, and a length of frequency-domain resources occupied by the uplink control channel element may be equal to a length of frequency-domain resources occupied by a number B of RBs, both of A and B being positive integers greater than or equal to 1.

In combination with the second aspect, in some implementation modes of the second aspect, the method may further include that, the network device determines the length of the time-domain resources and/or frequency-domain resources occupied by the uplink control channel elements according to a rule specified by a protocol.

In combination with the second aspect, in some implementation modes of the second aspect, the method may further include that, the network device configures the length of the time-domain resources and/or frequency-domain resources occupied by the uplink control channel elements.

In combination with the second aspect, in some implementation modes of the second aspect, the maximum bit number of uplink control information which can be transmitted by one uplink control channel element may be N, and a value of N may be set in one of the following manners: setting the value of N to be 2; the value of N is set to be equal to a preset maximum bit number of ACK/NACK information corresponding to downlink data transmitted in a time unit; and the value of N is configured by the network device.

In combination with the second aspect, in some implementation modes of the second aspect, the operation that the network device determines the multiple uplink control channel elements for transmitting the target uplink control information may include that, the network device transmits multiple pieces of downlink data to the terminal device, each of the multiple pieces of downlink data corresponding to independent ACK/NACK information and the target uplink control information including the ACK/NACK information of the multiple pieces of downlink data; and for each of the multiple pieces of downlink data, the network device determines one or more corresponding uplink control channel elements, to obtain the multiple uplink control channel elements.

In combination with the second aspect, in some implementation modes of the second aspect, each of the multiple pieces of downlink data may correspond to at least one of the multiple uplink control channel elements, each of the multiple uplink control channel elements being configured to transmit the ACK/NACK information of the downlink data corresponding to the uplink control channel element.

In combination with the second aspect, in some implementation modes of the second aspect, the method may further include that, the network device determines a number of uplink control channel elements required for transmission of the target uplink control information according to a bit number of the target uplink control information and a maximum bit number of the uplink control information which can be transmitted by one uplink control channel element.

In combination with the second aspect, in some implementation modes of the second aspect, the operation that the network device determines the number of the uplink control channel elements required for transmission of the target uplink control information according to the bit number of the target uplink control information and the maximum bit number of the uplink control information which can be transmitted by one uplink control channel element may include that, the network device determines the number of the uplink control channel elements required for transmission of the target uplink control information according to $K \cdot \lceil M/N \rceil$, where M may represent the bit number of the target uplink control information, N may represent the maximum bit number of the uplink control information which can be transmitted by one uplink control channel element and K may be a positive integer greater than or equal to 1.

In combination with the second aspect, in some implementation modes of the second aspect, the method may further include that, the network device generates indication information, the indication information including information for determining the resources occupied by the multiple uplink control channel elements; and the network device transmits the indication information to the terminal device.

In combination with the second aspect, in some implementation modes of the second aspect, the indication information may be DCI.

In combination with the second aspect, in some implementation modes of the second aspect, the method may further include that, the network device determines a resource occupied by a first uplink control channel element in the multiple uplink control channel elements; and the network device determines resources occupied by the other uplink control channel elements, except the first uplink control channel element, in the multiple uplink control channel elements according to the resource occupied by the first uplink control channel element.

In combination with the second aspect, in some implementation modes of the second aspect, the operation that the network device determines the resources occupied by the other uplink control channel elements, except the first uplink control channel element, in the multiple uplink control channel elements according to the resource occupied by the first uplink control channel element may include that, the network device determines serial numbers of the resources occupied by the other uplink control channel elements according to a serial number of the resource occupied by the first uplink control channel element; and the network device determines the resources occupied by the other uplink control channel elements according to the serial numbers of the resources occupied by the other uplink control channel elements.

In combination with the second aspect, in some implementation modes of the second aspect, the operation that the network device determines the resources occupied by the other uplink control channel elements according to the serial numbers of the resources occupied by the other uplink control channel elements may include that, the network device determines the serial numbers of the resources occupied by the other uplink control channel elements according to the serial number of the resource occupied by the first uplink control channel element and a predefined function; or, the network device determines the serial numbers of the resources occupied by the other uplink control channel elements according to the serial number of the resource occupied by the first uplink control channel element and a preset offset; or, the network device determines the serial numbers of the resources occupied by the other uplink control channel elements according to the serial number of the resource occupied by the first uplink control channel element and HARQ timing of the other downlink data, the multiple uplink control channel elements being configured to transmit the ACK/NACK information of the multiple pieces of downlink data respectively and the other downlink data being the downlink data, except the downlink data corresponding to the first uplink control channel element, in the multiple pieces of downlink data; or, the network device determines the serial numbers of the resources occupied by the other uplink control channel elements according to the serial number of the resource occupied by the first uplink control channel element, and sequence numbers of time units where the other downlink data are located and/or sequence numbers of carriers where the other downlink data are located, the multiple uplink control channel elements being configured to transmit the ACK/NACK information of the multiple pieces of downlink data respectively and the other downlink data being the downlink data, except the downlink data corresponding to the first uplink control channel element, in the multiple pieces of downlink data; or, the network device determines the serial numbers of the resources occupied by the other uplink control channel elements according to the serial number of the resource occupied by the first uplink control channel element and serial numbers of the other downlink data, the multiple uplink control channel elements being configured to transmit the ACK/NACK information of the multiple pieces of downlink data respectively and the other downlink data being the downlink data, except the downlink data corresponding to the first uplink control channel element, in the multiple pieces of downlink data; or, the network device determines the serial numbers of the resources occupied by the other uplink control channel elements according to the serial number of the resource occupied by the first uplink control channel element and serial numbers of TBs or coding blocks carried in the other downlink data, the multiple uplink control channel elements being configured to transmit the ACK/NACK information of the multiple pieces of downlink data respectively and the downlink data being the downlink data, except the downlink data corresponding to the first uplink control channel element, in the multiple pieces of downlink data.

In combination with the second aspect, in some implementation modes of the second aspect, the resources occupied by the other uplink control channel elements may be at least partially the same as the resource occupied by the first uplink control channel element.

In combination with the second aspect, in some implementation modes of the second aspect, the operation that the network device determines the resource occupied by the first uplink control channel element in the multiple uplink control channel elements may include that, the network device configures the resource occupied by the first uplink control channel element; or, the network device determines the resource occupied by the first uplink control channel element according to an RNTI of the terminal device or an ID of the terminal; or, the network device determines the resource occupied by the first uplink control channel element according to a serial number of a physical resource occupied by a downlink control channel corresponding to the first uplink control channel element.

In combination with the second aspect, in some implementation modes of the second aspect, the resource occupied by an uplink control channel element may include at least one of a time-domain resource, a frequency-domain resource, or a code-domain resource.

In combination with the second aspect, in some implementation modes of the second aspect, the multiple uplink control channel elements may be used to repeatedly transmit the target uplink control information.

In combination with the second aspect, in some implementation modes of the second aspect, the multiple uplink control channel elements may be used together to transmit the target uplink control information, and different uplink control channel elements in the multiple uplink control channel elements may be used to transmit different information in the target uplink control information.

In combination with the second aspect, in some implementation modes of the second aspect, the time unit may be a time slot.

A third aspect provides a terminal device, which includes units configured to execute the method in the first aspect.

A fourth aspect provides a network device, which includes units configured to execute the method in the second aspect.

A fifth aspect provides a terminal device, which includes a processor and a transceiver, the processor executing the method in the first aspect on the basis of the transceiver.

A sixth aspect provides a network device, which includes a processor and a transceiver, the processor executing the method in the second aspect on the basis of the transceiver.

A seventh aspect provides a computer-readable medium, which stores program codes configured to be executed by a terminal device, the program codes including instructions configured to execute the method in the first aspect.

An eighth aspect provides a computer-readable medium, which stores program codes configured to be executed by a network device, the program code including instructions configured to execute the method in the second aspect.

In the embodiments of the disclosure, uplink control information is transmitted between the terminal device and the network device by taking an uplink control channel element as a unit, and in a transmission process of the target uplink control information, the terminal device may determine the number of the uplink control channel elements to be used according to the target uplink control information and then transmit the target uplink control information by use of the determined uplink control channel elements. In other words, the terminal device may flexibly select uplink resources required for transmission of the target uplink control information according to a practical condition, so that transmission flexibility of the uplink control information is improved.

BRIEF DESCRIPTION OF DRAWINGS

FIG. 2b is a schematic diagram of a mapping relationship between a Physical Downlink Shared Channel (PDSCH) and an uplink control channel element according to an embodiment of the disclosure.

FIG. 3 is a schematic flowchart of a method for uplink control information transmission according to an embodiment of the disclosure.

FIG. 4 is a schematic structure diagram of a network device according to an embodiment of the disclosure.

DETAILED DESCRIPTION

The technical solutions in the embodiments of the disclosure will be clearly and completely described below in combination with the drawings in the embodiments of the disclosure.

It is to be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS), NR and 5G.

It is also to be understood that, in the embodiments of the disclosure, a terminal device may include, but not limited to, a Mobile Station (MS), a mobile terminal, a mobile telephone, User Equipment (UE), a handset, portable equipment and the like. The terminal device may communicate with one or more core networks through a Radio Access Network (RAN). For example, the terminal device may be a mobile phone (or called a "cell" phone), a computer with a wireless communication function and the like. The terminal device may also be a portable, pocket, handheld, computer-embedded or vehicle-mounted mobile device.

In the embodiments of the disclosure, a network device may be an access network device and, for example, may be a base station, a Transmit and Receive Point (TRP) or an access point. The base station may be a Base Transceiver Station (BTS) in the GSM or the CDMA, may also be a NodeB in the WCDMA, may also be an Evolved Node B (eNB or e-NodeB) in the LTE and may further be a gNB in the NR or the 5G. There are no specific limits made thereto in the embodiments of the disclosure.

It is described above that, in a future communication system, there may exist a relatively great difference between the bit numbers of uplink control information transmitted by a terminal device in different time units. Therefore, a definition manner for uplink control channel formats in a present protocol is unsuitable for the future communication system. Specifically, if a large number of uplink control channel formats are defined, the protocol may inevitably be overcomplicated and, if only a small number of uplink control channel formats with high capacities are defined, uplink transmission resources may be wasted.

The embodiments of the disclosure disclose a method for uplink control information transmission, which can support flexible extension of resources for transmission of uplink control information. Detailed descriptions will be made below in combination with FIG. 1.

Figure 1:
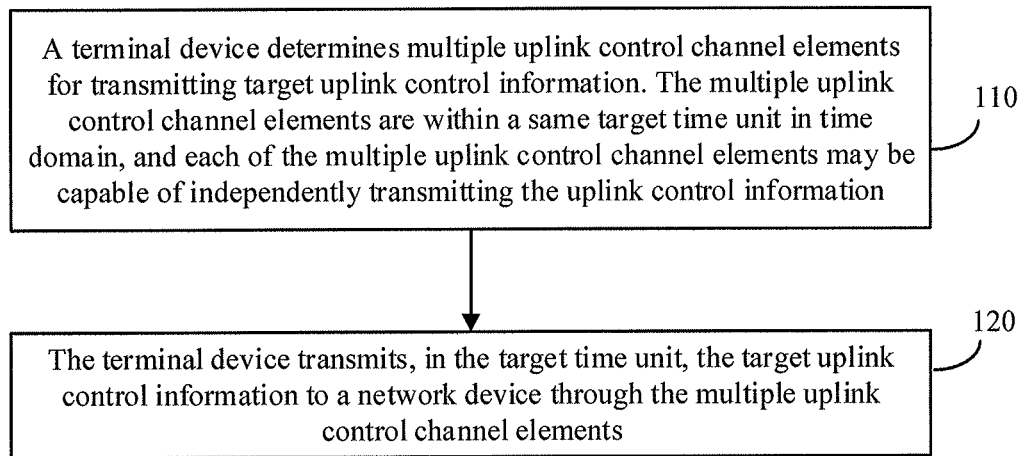
FIG. 1 is a schematic flowchart of a method for uplink control information transmission according to an embodiment of the disclosure.

FIG. 1 is a schematic flowchart of a method for uplink control information transmission according to an embodiment of the disclosure. The method illustrated in FIG. 1 includes the following actions.

In 110, a terminal device determines multiple uplink control channel elements for transmitting target uplink control information. The multiple uplink control channel elements are within the same target time unit in time domain, and each of the multiple uplink control channel elements may be capable of independently transmitting the uplink control information (i.e., one or more uplink control channel elements can independently transmit the uplink control information).

Figure 2A:
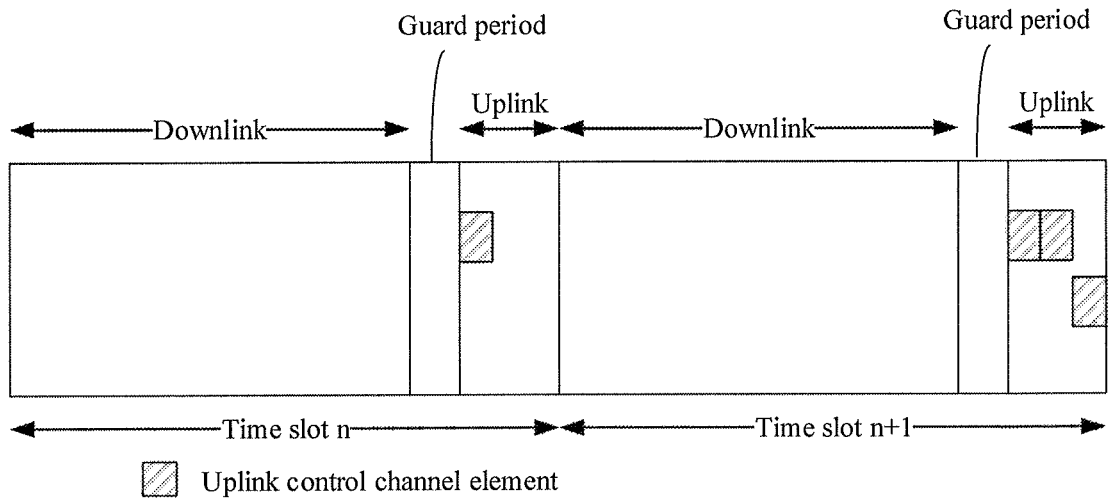
FIG. 2a is a location distribution diagram of multiple target time units in a time slot according to an embodiment of the disclosure.

Specifically, a time unit may be defined in any of multiple manners. For example, the time unit may be a time slot. For example, the time unit is a time slot and the multiple uplink control channel elements are three uplink control channel elements. The target time unit may be a time slot n+1 in FIG. 2a, the three uplink control channel elements are located in an uplink region of the time slot n+1, and the three uplink control channel elements carry the target uplink control information to be transmitted in the time slot n+1.

There are no specific limits made to a type of the target uplink control information in the embodiment of the disclosure. For example, ACK/NACK information of downlink data may be included, and Channel State Information (CSI) and the like may also be included.

The uplink control channel elements in the disclosure may be resource elements configured to carry the uplink control information or resource particles configured to carry the uplink control information. For example, they may be resource elements or resource particles configured to carry the ACK/NACK information. In addition, in some embodiments, the uplink control channel elements may also be called Physical Uplink Control Channel (PUCCH) elements, PUCCH resource elements or PUCCH resource particles.

In 120, the terminal device transmits, in the target time unit, the target uplink control information to a network device through the multiple uplink control channel elements.

In the embodiment of the disclosure, uplink control information is transmitted between the terminal device and the network device by taking an uplink control channel element as a unit. In a transmission process of the target uplink control information, the terminal device may determine the number of the uplink control channel elements to be used according to the target uplink control information, and then transmit the target uplink control information by use of the determined uplink control channel elements. In other words, the terminal device may flexibly select uplink resources required for transmission of the target uplink control information according to a practical condition, so that transmission flexibility of the uplink control information is improved. For example, an uplink control channel element may correspond to an uplink control channel format with a low capacity, and the terminal device may flexibly extend the transmission resources for the uplink control information by taking the uplink control channel element as a unit according to a practical requirement, so that the transmission flexibility of the uplink control information is improved.

Alternatively, in some embodiments, before 110, the method illustrated in FIG. 1 may further include that, the terminal device determines the uplink control channel elements. For example, at least one of the following information of the uplink control channel elements is determined: a length of time-domain resources occupied by the uplink control channel elements, a length of frequency-domain resources occupied by the uplink control channel elements, the maximum bit number of uplink control information which can be transmitted by the uplink control channel element and the like.

Alternatively, in some embodiments, before 110, the method illustrated in FIG. 1 may further include that, the terminal device determines the target uplink control information to be transmitted in the target time unit. Specifically, the target uplink control information may include the ACK/NACK information corresponding to the downlink data, and the terminal device may determine the ACK/NACK information to be transmitted in the target time unit according to the amount of received target downlink data, the target downlink data being downlink data of which the corresponding ACK/NACK information is to be transmitted in the target time unit.

Alternatively, as an embodiment, the length of the time-domain resources occupied by an uplink control channel element is equal to a length of time-domain resources occupied by a number A of OFDM symbols, and the length of the frequency-domain resources occupied by the uplink control channel element is equal to a length of frequency-domain resources occupied by a number B of RBs, both A and B being positive integers greater than or equal to 1. For example, A=B=1. That is, an uplink control channel element occupies a symbol in the time domain, and occupies a frequency-domain resource length, for example, 12 subcarriers, corresponding to an RB in the frequency domain.

In the embodiment of the disclosure, a size of the uplink control channel element is fixed and the terminal device and the network device are not required to determine the size of the uplink control channel element every time, so that a transmission process of the uplink control information is simplified.

Alternatively, as an embodiment, the method illustrated in FIG. 1 may further include that, the terminal device determines the length of the time-domain resources and/or frequency-domain resources occupied by the uplink control channel elements according to a rule specified by a protocol. In other words, the terminal device may determine the length of the time-domain resources occupied by the uplink control channel elements according to the rule specified by the protocol; and/or the terminal device may determine the length of the frequency-domain resources occupied by the uplink control channel elements according to the rule specified by the protocol.

Specifically, the terminal device may be a terminal device following a certain protocol and the terminal device may determine the length of the time-domain resources and/or frequency-domain resources occupied by the uplink control channel elements according to a rule specified by the protocol.

Alternatively, as an embodiment, the method illustrated in FIG. 1 may further include that, the terminal device determines the length of the time-domain resources and/or frequency-domain resources occupied by the uplink control channel elements according to signaling transmitted by the network device.

Alternatively, as an embodiment, the maximum bit number of the uplink control information which can be transmitted by one uplink control channel element is N, and the value of N is set to be 2. Such a definition manner is easy to implement, and the transmission process of the uplink control information may be simplified.

Alternatively, as an embodiment, the maximum bit number of the uplink control information which can be transmitted by one uplink control channel element is N, and the value of N is set to be equal to a preset maximum bit number of ACK/NACK information corresponding to downlink data transmitted in a time unit. Specifically, the time unit may be a time slot.

Alternatively, as an embodiment, the maximum bit number of the uplink control information which can be transmitted by one uplink control channel element is N, and the value of N may be configured by the network device. Specifically, the terminal device may receive the signaling or indication information transmitted by the network device, and the indication information may be configured to determine the value of N. For example, the terminal device receives DCI transmitted by the network device, and the DCI includes information indicating the value of N.

Alternatively, as an embodiment, 110 may include that, the terminal device receives multiple pieces of downlink data, each of the multiple pieces of downlink data corresponding to independent ACK/NACK information, and the target uplink control information including the ACK/NACK information of the multiple pieces of downlink data (or, the target uplink control information is the ACK/NACK information of the multiple pieces of downlink data); and for each of the multiple pieces of downlink data, the terminal device determines one or more corresponding uplink control channel elements (i.e., there may be an uplink control channel element in which ACK/NACK information of a piece of downlink data can be independently transmitted), to obtain the multiple uplink control channel elements.

It is to be noted that the downlink data in the disclosure may be downlink shared data and, in some embodiments, may specifically be a PDSCH.

It is to be noted that there are no specific limits made to a correspondence between multiple pieces of downlink data and uplink control channel elements in the embodiment of the disclosure. Specifically, each of the multiple pieces of downlink data may correspond to at least one of the multiple uplink control channel elements, each of the multiple uplink control channel elements being configured to transmit the ACK/NACK information of the downlink data corresponding to the uplink control channel element. For example, the multiple pieces of downlink data correspond to the multiple uplink control channel elements one to one; or, at least two of the multiple pieces of downlink data correspond to one of the multiple uplink control channel elements, each of the multiple uplink control channel elements being configured to transmit the ACK/NACK information of the downlink data corresponding to the uplink control channel element. For another example, the multiple pieces of downlink data may correspond to one uplink control channel element.

Alternatively, as an embodiment, the method illustrated in FIG. 1 may further include that, the terminal device determines a number of uplink control channel elements required for transmission of the target uplink control information according to the bit number of the target uplink control information and the maximum bit number of the uplink control information which can be transmitted by one uplink control channel element.

For example, the terminal device may determine the number of the uplink control channel elements required for transmission of the target uplink control information according to $K \cdot \lceil M/N \rceil$, where M represents the bit number of the target uplink control information, N represents the maximum bit number of the uplink control information which can be transmitted by one uplink control channel element and K is a positive integer greater than or equal to 1.

For another example, the terminal device may determine the number of the uplink control channel elements required for transmission of the target uplink control information to be (M/N)+1.

Alternatively, as an embodiment, the method illustrated in FIG. 1 may further include that, the terminal device receives indication information transmitted by the network device, the indication information including information for determining the resources occupied by the multiple uplink control channel elements (or, the indication information including the information for indicating the resources occupied by the multiple uplink control channel elements. For convenient description, the information for determining the resources occupied by the multiple uplink control channel elements is called target information below); and the terminal device determines the resources occupied by the multiple uplink control channel elements according to the indication information.

The indication information may be, for example, DCI.

It is to be noted that the resources occupied by the uplink control channel elements in the disclosure may all be replaced with resource locations of the uplink control channel elements. Furthermore, in some embodiments, the resource locations of the uplink control channel elements may include at least one of time-domain resource locations, frequency-domain resource locations, or code-domain sequence indexes of the uplink control channel elements.

It is to be understood that the terminal may determine the resources occupied by the multiple uplink control channel elements on the basis of the target information in multiple manners. In some embodiments, the target information may directly indicate the resources occupied by the multiple uplink control channel elements, for example, the target information may directly indicate time-frequency locations of the resources occupied by the multiple uplink control channel elements, and the terminal device may directly determine the resources occupied by the multiple uplink control channel elements according to an indication of the target information. In some other embodiments, the target information may include a configuration parameter for determining the resources occupied by the multiple uplink control channel elements, and the terminal device may determine the resources occupied by the multiple uplink control channel elements on the basis of the configuration parameter in a predetermined manner.

Alternatively, as an embodiment, the method illustrated in FIG. 1 may further include that, the terminal device determines a resource occupied by a first uplink control channel element in the multiple uplink control channel elements; and the terminal device determines resources occupied by the other uplink control channel elements, except the first uplink control channel element, in the multiple uplink control channel elements according to the resource occupied by the first uplink control channel element.

It is to be noted that the first uplink control channel element may be an uplink control channel element, or may be two or more than two uplink control channel resources. Specifically, the first uplink control channel element may be some of the multiple uplink control channel elements.

In the embodiment of the disclosure, the resources occupied by the other uplink control channel elements are determined on the basis of the resource occupied by the first uplink control channel element, the terminal device and the network device may determine the resources occupied by the multiple uplink control channel elements through the same rule on the basis of the resource occupied by the first uplink control channel element, and the network device is not required to configure the resources for each uplink control channel element, so that the transmission process of the uplink control information is simplified.

It is to be noted that the resources occupied by the other uplink control channel elements may be determined according to the resource occupied by the first uplink control channel element in multiple manners. There are no specific limits made thereto in the embodiment of the disclosure. Detailed descriptions will be made below in combination with specific embodiments.

Alternatively, in some embodiments, the resources occupied by the other uplink control channel elements are at least partially the same as the resource occupied by the first uplink control channel element. Specifically, the terminal device may allocate resources for the other uplink control channel elements, which are same as those for the first uplink control channel element in terms of one or two of the following: time-domain resources, frequency-domain resources and code-domain resources. For example, the terminal device may allocate a time-domain resource for the other uplink control channel elements, which is the same as that for the first uplink control channel element, while the frequency-domain resource(s) and the code-domain resource(s) for the other uplink control channel elements may be different from those for the first uplink control channel element. For another example, the terminal device may allocate a frequency-domain resource for the other uplink control channel elements, which is the same as that for the first uplink control channel element, while the time-domain resource(s) and the code-domain resource(s) for the other uplink control channel elements may be different from those for the first uplink control channel element.

Alternatively, in some embodiments, the operation that the terminal device determines the resources occupied by the other uplink control channel elements, except the first uplink control channel element, in the multiple uplink control channel elements according to the resource occupied by the first uplink control channel element may include that, the terminal device determines serial numbers of the resources occupied by the other uplink control channel elements according to a serial number of the resource occupied by the first uplink control channel element; and the terminal device determines the resources occupied by the other uplink control channel elements according to the serial numbers of the resources occupied by the other uplink control channel elements.

It is to be noted that the serial number in the embodiment of the disclosure may also be called an index.

It is also to be noted that the serial numbers of the resources occupied by the other uplink control channel elements may be determined according to the serial number of the resource occupied by the first uplink control channel element in multiple manners. Detailed descriptions will be made below.

Alternatively, in some embodiments, the terminal device determines the serial numbers of the resources occupied by the other uplink control channel elements according to the serial number of the resource occupied by the first uplink control channel element and a predefined function. For example, the predefined function is x+i, x represents the serial number of the resource occupied by the first uplink control channel element, and i represents an ith uplink control channel element in the other uplink control channel elements, and the serial number of the resource occupied by the first uplink control channel element may be substituted into the function to determine the serial numbers of the resources occupied by the other uplink control channel elements. The predefined function may also be functions of other forms which will not be listed herein one by one.

Alternatively, in some embodiments, the terminal device may determine the serial numbers of the resources occupied by the other uplink control channel elements according to the serial number of the resource occupied by the first uplink control channel element and a predefined offset. The offset may be a fixed value, or may be semi-statically configured or dynamically indicated by the network device.

For example, if the serial number of the resource occupied by the first uplink control channel element is T and the preset offset is 5, the serial numbers of the other uplink control channel elements may be T+5+i, i represents the ith uplink control channel element in the multiple uplink control channel elements. For another example, if the serial number of the resource occupied by the first uplink control channel element is T and the preset offset is 5, the serial numbers of the other uplink control channel elements may be 2(T+5)+i, i represents the ith uplink control channel element in the multiple uplink control channel elements.

Alternatively, in some embodiments, the terminal device may determine the serial numbers of the resources occupied by the other uplink control channel elements according to the serial number of the resource occupied by the first uplink control channel element and HARQ timing (or called HARQ timing) of the other downlink data. The multiple uplink control channel elements are configured to transmit the ACK/NACK information of the multiple pieces of downlink data respectively, and the other downlink data are downlink data, except the downlink data corresponding to the first uplink control channel element, in the multiple pieces of downlink data.

It is to be understood that HARQ timing of a piece of downlink data may be used to indicate a timing relationship between receiving time (receiving time slot or receiving subframe) of the downlink data and feedback time (feedback time slot or feedback subframe) of ACK/NACK information of the downlink data, and the timing relationship may be predefined by a system.

In the embodiment of the disclosure, the multiple uplink control channel elements may form a one-to-one correspondence with the multiple pieces of downlink data, and each uplink control channel element may be configured to feed back the ACK/NACK information of the corresponding downlink data. Therefore, the other uplink control channel elements may form a one-to-one correspondence with the other downlink data.

For example, the serial number of the resource occupied by the first uplink control channel element is T, and ith downlink data in the other downlink data corresponds to the ith uplink control channel element in the other uplink control channel elements. If HARQ timing of the ith downlink data is n+k, the serial number of the ith uplink control channel element in the other uplink control channel elements may be T+k, where n represents a serial number of a receiving subframe of the downlink data, and k represents a difference between serial numbers of a feedback subframe of the downlink data and the receiving subframe of the downlink data.

Alternatively, in some embodiments, the terminal device determines the serial numbers of the resources occupied by the other uplink control channel elements according to the serial number of the resource occupied by the first uplink control channel element and sequence numbers of time units where the other downlink data are located and/or sequence numbers of carriers where the other downlink data are located. The multiple uplink control channel elements are configured to transmit the ACK/NACK information of the multiple pieces of downlink data respectively, and the other downlink data are downlink data, except the downlink data corresponding to the first uplink control channel element, in the multiple pieces of downlink data.

In the embodiment of the disclosure, the multiple uplink control channel elements may form the one-to-one correspondence with the multiple pieces of downlink data, and each uplink control channel element may be configured to feed back the ACK/NACK information of the corresponding downlink data. Therefore, the other uplink control channel elements may form the one-to-one correspondence with the other downlink data.

For example, the serial numbers of the resources occupied by the other uplink control channel elements may be sums, differences or any other combinations of the serial number of the resource occupied by the first uplink control channel element and the sequence numbers of the time units where the other downlink data are located and/or the sequence numbers of the carriers where the other downlink data are located.

Alternatively, in some embodiments, the terminal device determines the serial numbers of the resources occupied by the other uplink control channel elements according to the serial number of the resource occupied by the first uplink control channel element and serial numbers of the other downlink data. The multiple uplink control channel elements are configured to transmit the ACK/NACK information of the multiple pieces of downlink data respectively, and the other downlink data are downlink data, except the downlink data corresponding to the first uplink control channel element, in the multiple pieces of downlink data.

In the embodiment of the disclosure, the multiple uplink control channel elements may form the one-to-one correspondence with the multiple pieces of downlink data, and each uplink control channel element may be configured to feed back the ACK/NACK information of the corresponding downlink data. Therefore, the other uplink control channel elements may form the one-to-one correspondence with the other downlink data.

For example, the serial numbers of the resources occupied by the other uplink control channel elements may be sums, differences or any other combinations of the serial number of the resource occupied by the first uplink control channel element and the serial numbers of the other downlink data.

Alternatively, in some embodiments, the terminal device determines the serial numbers of the resources occupied by the other uplink control channel elements according to the serial number of the resource occupied by the first uplink control channel element and serial numbers of TBs or coding blocks carried in the other downlink data. The multiple uplink control channel elements are configured to transmit the ACK/NACK information of the multiple pieces of downlink data respectively, and the other downlink data are downlink data, except the downlink data corresponding to the first uplink control channel element, in the multiple pieces of downlink data. Specifically, the multiple uplink control channel elements form the one-to-one correspondence with the multiple pieces of downlink data, and each uplink control channel element may be configured to feed back the ACK/NACK information of the corresponding downlink data.

In the embodiment of the disclosure, the multiple uplink control channel elements may form the one-to-one correspondence with the multiple pieces of downlink data, and each uplink control channel element may be configured to feed back the ACK/NACK information of the corresponding downlink data. Therefore, the other uplink control channel elements may form the one-to-one correspondence with the other downlink data.

For example, the serial numbers of the resources occupied by the other uplink control channel elements may be sums, differences or any other combinations of the serial number of the resource occupied by the first uplink control channel element and the serial numbers of the TBs or coding blocks carried in the other downlink data.

A manner for determining the resources occupied by the other uplink control channel elements according to the resource occupied by the first uplink control channel element is mainly described above. A manner for determining the resource occupied by the first uplink control channel element will be described below in detail.

Alternatively, as an embodiment, the operation that the terminal device determines the resource occupied by the first uplink control channel element in the multiple uplink control channel elements may include that, the terminal device determines the resource occupied by the first uplink control channel element according to the signaling transmitted by the network device. For example, the terminal receives a PDCCH transmitted by the network device, the PDCCH containing information indicating the resource occupied by the first uplink control channel element.

Alternatively, as an embodiment, the operation that the terminal device determines the resource occupied by the first uplink control channel element in the multiple uplink control channel elements may include that, the terminal device determines the resource occupied by the first uplink control channel element according to an RNTI of the terminal device or an ID of the terminal.

For example, the terminal device calculates the serial number of the first uplink control channel element through a predefined operation rule according to the RNTI or the ID, and then determines the resource occupied by the first uplink control channel element on the basis of the serial number of the first uplink control channel element.

Alternatively, as an embodiment, the operation that the terminal device determines the resource occupied by the first uplink control channel element in the multiple uplink control channel elements may include that, the terminal device determines the resource occupied by the first uplink control channel element according to a serial number of a physical resource occupied by a downlink control channel corresponding to the first uplink control channel element.

For example, the terminal device calculates the serial number of the first uplink control channel element through a predefined operation rule according to serial number of the physical resource occupied by the downlink control channel, and then determines the resource occupied by the first uplink control channel element on the basis of the serial number of the first uplink control channel element.

The first uplink control channel element may be configured to feed back ACK/NACK information of first downlink data, and the downlink control channel corresponding to the first uplink control channel element may be a downlink control channel configured to schedule the first downlink data.

Alternatively, as an embodiment, the resource occupied by an uplink control channel element includes at least one of a time-domain resource, a frequency-domain resource, or a code-domain resource. It is to be noted that the code-domain resource occupied by an uplink control channel element may be a code-domain sequence adopted when information in the uplink control channel element is coded.

Alternatively, as an embodiment, the multiple uplink control channel elements are used to repeatedly transmit the target uplink control information.

In the embodiment of the disclosure, the multiple uplink control channel elements are used to repeatedly transmit the target uplink control information, so that transmission reliability of the target uplink control information may be improved.

For example, the terminal device adopts Q uplink control channel elements to repeatedly transmit P-bit uplink control information in a time unit, where P is not larger than N, each control channel element in the Q uplink control channel elements carries the same P-bit information, Q is larger than 1, P is greater than or equal to 1 and N represents the maximum bit number of the uplink control information which can be transmitted by one uplink control channel element.

Alternatively, as an embodiment, the multiple uplink control channel elements are used together to transmit the target uplink control information, and different uplink control channel elements in the multiple uplink control channel elements are used to transmit different information in the target uplink control information.

For example, the terminal device adopts Q uplink control channel elements to transmit K-bit information in a time unit, and information carried in part of channel elements in the Q uplink control channel elements is different from information carried in the other uplink control channel elements, where K is a positive integer larger than 1, Q is larger than 1 and P is greater than or equal to 1.

The embodiment of the disclosure will be described below in more detail with the condition that the downlink data is a PDSCH and the time unit is a time slot as an example.

A first scenario: the terminal device firstly determines the sizes of the resources occupied by the uplink control channel elements; the terminal device determines that ACK/NACK information corresponding to L PDSCHs is required to be fed back in a target time slot, each uplink control channel element being configured to feed back ACK/NACK information corresponding to one PDSCH and L being larger than 1; and the terminal device determines that L uplink control channel elements are required to transmit the uplink control information in a slot.

Specifically, as illustrated in FIG. 2b, the terminal device determines that the length of the time-domain resources occupied by the uplink control channel elements is one OFDM symbol, and the length of the frequency-domain resources is a frequency-domain resource length corresponding to one RB, for example, 12 subcarriers. The terminal device receives the DCI, the DCI schedules the terminal to receive the PDSCHs, and the DCI further indicates a resource location (time-domain location, frequency-domain location and code-domain sequence index) of the uplink control channel element for transmitting an ACK/NACK corresponding to the present PDSCH.

A second scenario: the terminal device firstly determines the sizes of the resources occupied by the uplink control channel elements; the terminal device determines the maximum bit number N of the uplink control information which can be transmitted by one uplink control channel element and determines the bit number of the target uplink control information to be transmitted; and the terminal device determines the number of the uplink control channel elements required for transmission of the target uplink control information according to [M/N].

Specifically, the terminal device determines that the length of the time-domain resources occupied by the uplink control channel elements is one OFDM symbol and the length of the frequency-domain resources is a frequency-domain resource length corresponding to one RB, for example, 12 subcarriers. There is made such a hypothesis that an uplink control channel element carry at most 2-bit information. If the terminal is required to feed back 10-bit CSI in the target time slot, the terminal device determines to adopt five uplink control channel elements to transmit the 10-bit CSI. If the terminal is required to feed back 15-bit CSI in the target time slot, the terminal determines to adopt eight uplink control channel elements to transmit the 15-bit CSI.

The uplink control information transmission method of the embodiments of the disclosure is described above in combination with FIG. 1 to FIG. 2b in detail from the view of the terminal device. The uplink control information transmission method of the embodiments of the disclosure will be described below in combination with FIG. 3 in detail from the view of the network device. It is to be understood that descriptions made on a network device side correspond to descriptions made on a terminal device side and similar contents may be seen from the above and will not be elaborated herein.

FIG. 3 is a schematic flowchart of a method for uplink control information transmission according to an embodiment of the disclosure. The method illustrated in FIG. 3 includes the following actions.

In 310, a network device determines multiple uplink control channel elements for transmitting target uplink control information. The multiple uplink control channel elements are within the same target time unit in time domain, and each of the multiple uplink control channel elements may be capable of independently transmitting the uplink control information.

In 320, the network device receives, in the target time unit, the target uplink control information transmitted by a terminal device through the multiple uplink control channel elements.

In the embodiment of the disclosure, uplink control information is transmitted between the terminal device and the network device by taking an uplink control channel element as a unit, and in a transmission process of the target uplink control information, the terminal device may determine the number of the uplink control channel elements to be used according to the target uplink control information, and then transmit the target uplink control information by use of the determined uplink control channel elements. In other words, the terminal device may flexibly select uplink resources required for transmission of the target uplink control information according to a practical condition, so that transmission flexibility of the uplink control information is improved. For example, an uplink control channel element may correspond to an uplink control channel format with a low capacity, and the terminal device may flexibly extend the transmission resources for the uplink control information by taking the uplink control channel element as the unit according to a practical requirement, so that the transmission flexibility of the uplink control information is improved.

Alternatively, in some embodiments, before 310, the method illustrated in FIG. 3 may further include that, the network device determines the uplink control channel elements. For example, at least one of the following information of the uplink control channel elements is determined: a length of time-domain resources occupied by the uplink control channel elements, a length of frequency-domain resources occupied by the uplink control channel elements, the maximum bit number of uplink control information which can be transmitted by the uplink control channel element and the like.

Alternatively, in some embodiments, before 310, the method illustrated in FIG. 3 may further include that, the network device determines the target uplink control information to be transmitted in the target time unit. Specifically, the target uplink control information may include the ACK/NACK information corresponding to the downlink data, and the terminal device may determine the ACK/NACK information required to be transmitted in the target time unit according to the amount of received target downlink data. The ACK/NACK information corresponding to the target downlink data is required to be transmitted in the target time unit.

Alternatively, in some embodiments, a length of time-domain resources occupied by the uplink control channel elements is equal to a length of time-domain resources occupied by a number A of OFDM symbols, and a length of frequency-domain resources occupied by the uplink control channel elements is equal to a length of frequency-domain resources occupied by a number B of RBs, both A and B being positive integers greater than or equal to 1.

Alternatively, in some embodiments, the method illustrated in FIG. 3 may further include that, the network device determines the length of the time-domain resources and/or frequency-domain resources occupied by the uplink control channel elements according to a rule specified by a protocol.

Alternatively, in some embodiments, the method illustrated in FIG. 3 may further include that, the network device configures the length of the time-domain resources and/or frequency-domain resources occupied by the uplink control channel elements.

Alternatively, in some embodiments, the maximum bit number of the uplink control information which can be transmitted by one uplink control channel element is N, and a value of N is set in one of the following manners.

A value of N is set to be 2.

The value of N is set to be equal to a preset maximum bit number of ACK/NACK information corresponding to downlink data transmitted in a time unit.

The value of N is configured by the network device.

Alternatively, in some embodiments, 310 may include that, the network device transmits multiple pieces of downlink data to the terminal device, each of the multiple pieces of downlink data corresponding to independent ACK/NACK information, and the target uplink control information including the ACK/NACK information of the multiple pieces of downlink data; and for each of the multiple pieces of downlink data, the network device determines one or more corresponding uplink control channel elements, to obtain the multiple uplink control channel elements.

Alternatively, in some embodiments, each of the multiple pieces of downlink data corresponds to at least one of the multiple uplink control channel elements, each of the multiple uplink control channel elements is configured to transmit the ACK/NACK information of the downlink data corresponding to the uplink control channel element.

Alternatively, in some embodiments, the method illustrated in FIG. 3 may further include that, the network device determines a number of uplink control channel elements required for transmission of the target uplink control information according to the bit number of the target uplink control information and the maximum bit number of the uplink control information which can be transmitted by one uplink control channel element.

Alternatively, in some embodiments, the operation that the network device determines the number of the uplink control channel elements required for transmission of the target uplink control information according to the bit number of the target uplink control information and the maximum bit number of the uplink control information which can be transmitted by one uplink control channel element includes that, the network device determines the number of the uplink control channel elements required for transmission of the target uplink control information according to K·⌈M/N⌉, where M may represent the bit number of the target uplink control information, N may represent the maximum bit number of the uplink control information which can be transmitted by one uplink control channel element, and K may be a positive integer greater than or equal to 1.

Alternatively, in some embodiments, the method illustrated in FIG. 3 may further include that, the network device generates indication information, the indication information including information for determining the resources occupied by the multiple uplink control channel elements; and the network device transmits the indication information to the terminal device.

Alternatively, in some embodiments, the indication information is DCI.

Alternatively, in some embodiments, the method illustrated in FIG. 3 may further include that, the network device determines a resource occupied by a first uplink control channel element in the multiple uplink control channel elements; and the network device determines resources occupied by the other uplink control channel elements, except the first uplink control channel element, in the multiple uplink control channel elements according to the resource occupied by the first uplink control channel element.

Alternatively, in some embodiments, the operation that the network device determines the resources occupied by the other uplink control channel elements, except the first uplink control channel element, in the multiple uplink control channel elements according to the resource occupied by the first uplink control channel element may include that, the network device determines serial numbers of the resources occupied by the other uplink control channel elements according to a serial number of the resource occupied by the first uplink control channel element; and the network device determines the resources occupied by the other uplink control channel elements according to the serial numbers of the resources occupied by the other uplink control channel elements.

Alternatively, in some embodiments, the operation that the network device determines the resources occupied by the other uplink control channel elements according to the serial numbers of the resources occupied by the other uplink control channel elements may include one of the following operations.

The network device determines the serial numbers of the resources occupied by the other uplink control channel elements according to the serial number of the resource occupied by the first uplink control channel element and a predefined function.

The network device determines the serial numbers of the resources occupied by the other uplink control channel elements according to the serial number of the resource occupied by the first uplink control channel element and a preset offset.

The network device determines the serial numbers of the resources occupied by the other uplink control channel elements according to the serial number of the resource occupied by the first uplink control channel element and HARQ timing of the other downlink data, the multiple uplink control channel elements being configured to transmit the ACK/NACK information of the multiple pieces of downlink data respectively, and the other downlink data being downlink data, except the downlink data corresponding to the first uplink control channel element, in the multiple pieces of downlink data.

The network device determines the serial numbers of the resources occupied by the other uplink control channel elements according to the serial number of the resource occupied by the first uplink control channel element and sequence numbers of time units where the other downlink data are located and/or sequence numbers of carriers where the other downlink data are located, the multiple uplink control channel elements being configured to transmit the ACK/NACK information of the multiple pieces of downlink data respectively, and the other downlink data being downlink data, except the downlink data corresponding to the first uplink control channel element, in the multiple pieces of downlink data.

The network device determines the serial numbers of the resources occupied by the other uplink control channel elements according to the serial number of the resource occupied by the first uplink control channel element and serial numbers of the other downlink data, the multiple uplink control channel elements being configured to transmit the ACK/NACK information of the multiple pieces of downlink data respectively, and the other downlink data being downlink data, except the downlink data corresponding to the first uplink control channel element, in the multiple pieces of downlink data.

The network device determines the serial numbers of the resources occupied by the other uplink control channel elements according to the serial number of the resource occupied by the first uplink control channel element and serial numbers of TBs or coding blocks carried in the other downlink data, the multiple uplink control channel elements being configured to transmit the ACK/NACK information of the multiple pieces of downlink data respectively, and the other downlink data being downlink data, except the downlink data corresponding to the first uplink control channel element, in the multiple pieces of downlink data.

Alternatively, in some embodiments, the resources occupied by the other uplink control channel elements are at least partially the same as the resource occupied by the first uplink control channel element.

Alternatively, in some embodiments, the operation that the network device determines the resource occupied by the first uplink control channel element in the multiple uplink control channel elements includes one of the following operations.

The network device configures the resource occupied by the first uplink control channel element.

The network device determines the resource occupied by the first uplink control channel element according to an RNTI of the terminal device or an ID of the terminal.

The network device determines the resource occupied by the first uplink control channel element according to a serial number of a physical resource occupied by a downlink control channel corresponding to the first uplink control channel element.

Alternatively, in some embodiments, the resource occupied by an uplink control channel element includes at least one of a time-domain resource, a frequency-domain resource, or a code-domain resource.

Alternatively, in some embodiments, the multiple uplink control channel elements are used to repeatedly transmit the target uplink control information.

Alternatively, in some embodiments, the multiple uplink control channel elements are used together to transmit the target uplink control information, and different uplink control channel elements in the multiple uplink control channel elements are used to transmit different information in the target uplink control information.

Alternatively, in some embodiments, the time unit is a time slot.

The method embodiments of the disclosure are described above in combination with FIG. 1 to FIG. 3 in detail and device embodiments of the disclosure will be described below in combination with FIG. 4 to FIG. 7 in detail. It is to be understood that the device embodiments correspond to the method embodiments and similar descriptions may be the method embodiments.

FIG. 4 is a schematic structure diagram of a terminal device according to an embodiment of the disclosure. The terminal device 400 illustrated in FIG. 4 includes a first determination module 410 and a transmitting module 420.

The first determination module 410 may be configured to determine multiple uplink control channel elements for transmitting target uplink control information. The multiple uplink control channel elements may be within the same target time unit in time domain, and each of the multiple uplink control channel elements may be capable of independently transmitting the uplink control information.

The transmitting module 420 may be configured to transmit, in the target time unit, the target uplink control information to a network device through the multiple uplink control channel elements.

Alternatively, in some embodiments, a length of time-domain resources occupied by an uplink control channel element is equal to a length of time-domain resources occupied by a number A of OFDM symbols, and a length of frequency-domain resources occupied by the uplink control channel element is equal to a length of frequency-domain resources occupied by a number B of RBs, both A and B being positive integers greater than or equal to 1.

Alternatively, in some embodiments, the terminal device 400 may further include a second determination module, configured to determine the length of the time-domain resources and/or frequency-domain resources occupied by the uplink control channel elements according to a rule specified by a protocol.

Alternatively, in some embodiments, the terminal device 400 may further include a third determination module, configured to determine the length of the time-domain resources and/or frequency-domain resources occupied by the uplink control channel elements according to signaling transmitted by the network device.

Alternatively, in some embodiments, the maximum bit number of uplink control information which can be transmitted by one uplink control channel element is N, and a value of N is set in one of the following manners: setting the value of N to be 2; the value of N is set to be equal to a preset maximum bit number of ACK/NACK information corresponding to downlink data transmitted in a time unit; and the value of N is configured by the network device.

Alternatively, in some embodiments, the first determination module 410 may specifically be configured to receive multiple pieces of downlink data, each of the multiple pieces of downlink data corresponding to independent ACK/NACK information and the target uplink control information including the ACK/NACK information of the multiple pieces of downlink data. And the first determination module is configured to, for each of the multiple pieces of downlink data, determine one or more corresponding uplink control channel elements, to obtain the multiple uplink control channel elements.

Alternatively, in some embodiments, each of the multiple pieces of downlink data corresponds to at least one of the multiple uplink control channel elements, each of the multiple uplink control channel elements being configured to transmit the ACK/NACK information of the downlink data corresponding to the uplink control channel element.

Alternatively, in some embodiments, the terminal device 400 may further include a fourth determination module, configured to determine a number of uplink control channel elements required for transmission of the target uplink control information according to the bit number of the target uplink control information and the maximum bit number of the uplink control information which can be transmitted by one uplink control channel element.

Alternatively, in some embodiments, the fourth determination module is specifically configured to determine the number of the uplink control channel elements required for transmission of the target uplink control information according to $K \cdot \lceil M/N \rceil$, where M represents the bit number of the target uplink control information, N represents the maximum bit number of the uplink control information which can be transmitted by one uplink control channel element, and K is a positive integer greater than or equal to 1.

Alternatively, in some embodiments, the terminal device 400 may further includes a first receiving module, configured to receive indication information transmitted by the network device, the indication information including information for determining the resources occupied by the multiple uplink control channel elements; and a fifth determination module, configured to determine the resources occupied by the multiple uplink control channel elements according to the indication information.

Alternatively, in some embodiments, the indication information is DCI.

Alternatively, in some embodiments, the terminal device 400 may further include a sixth determination module, configured to determine a resource occupied by a first uplink control channel element in the multiple uplink control channel elements; and a seventh determination module, configured to determine resources occupied by the other uplink control channel elements, except the first uplink control channel element, in the multiple uplink control channel elements according to the resource occupied by the first uplink control channel element.

Alternatively, in some embodiments, the seventh determination module may specifically be configured to determine serial numbers of the resources occupied by the other uplink control channel elements according to a serial number of the resource occupied by the first uplink control channel element, and determine the resources occupied by the other uplink control channel elements according to the serial numbers of the resources occupied by the other uplink control channel elements.

Alternatively, in some embodiments, the seventh determination module may specifically be configured to determine the serial numbers of the resources occupied by the other uplink control channel elements according to the serial number of the resource occupied by the first uplink control channel element and a predefined function; or, determine the serial numbers of the resources occupied by the other uplink control channel elements according to the serial number of the resource occupied by the first uplink control channel element and a preset offset. Or, the seventh determination module is specifically configured to determine the serial numbers of the resources occupied by the other uplink control channel elements according to the serial number of the resource occupied by the first uplink control channel element and HARQ timing of the other downlink data, the multiple uplink control channel elements being configured to transmit the ACK/NACK information of the multiple pieces of downlink data respectively and the other downlink data being the downlink data, except the downlink data corresponding to the first uplink control channel element, in the multiple pieces of downlink data. Or, the seventh determination module is specifically configured to determine the serial numbers of the resources occupied by the other uplink control channel elements according to the serial number of the resource occupied by the first uplink control channel element and sequence numbers of time units where the other downlink data are located and/or sequence numbers of carriers where the other downlink data are located, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the seventh determination module is specifically configured to determine the serial numbers of the resources occupied by the other uplink control channel elements according to the serial number of the resource occupied by the first uplink control channel element and serial numbers of the other downlink data, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the seventh determination module is specifically configured to determine the serial numbers of the resources occupied by the other uplink control channel elements according to the serial number of the resource occupied by the first uplink control channel element and serial numbers of TBs or coding blocks carried in the other downlink data, the multiple uplink control channel elements being configured to transmit the ACK/NACK information of the multiple pieces of downlink data respectively, and the downlink data being the downlink data, except the downlink data corresponding to the first uplink control channel element, in the multiple pieces of downlink data.

Alternatively, in some embodiments, the resources occupied by the other uplink control channel elements are at least partially the same as the resource occupied by the first uplink control channel element.

Alternatively, in some embodiments, the sixth determination module is specifically configured to determine the resource occupied by the first uplink control channel element according to the signaling transmitted by the network device. Or, the sixth determination module is specifically configured to determine the resource occupied by the first uplink control channel element according to an RNTI of the terminal device 400 or an ID of the terminal. Or, the sixth determination module is specifically configured to determine the resource occupied by the first uplink control channel element according to a serial number of a physical resource occupied by a downlink control channel corresponding to the first uplink control channel element.

Alternatively, in some embodiments, the resource occupied by an uplink control channel element includes at least one of a time-domain resource, a frequency-domain resource, or a code-domain resource.

Alternatively, in some embodiments, the multiple uplink control channel elements are used to repeatedly transmit the target uplink control information.

Alternatively, in some embodiments, the multiple uplink control channel elements are used together to transmit the target uplink control information, and different uplink control channel elements in the multiple uplink control channel elements are used to transmit different information in the target uplink control information.

Alternatively, in some embodiments, the time unit is a time slot.

Figure 5:
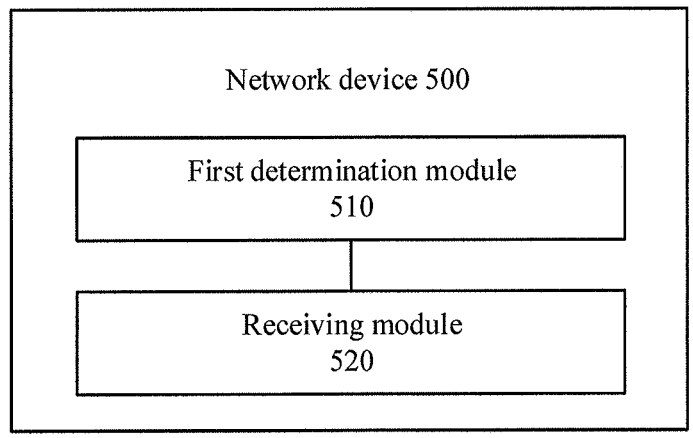
FIG. 5 is a schematic structure diagram of a network device according to an embodiment of the disclosure.

FIG. 5 is a schematic structure diagram of a network device according to an embodiment of the disclosure. The network device 500 illustrated in FIG. 5 includes a first determination module 510 and a receiving module 520.

The first determination module 510 may be configured to determine multiple uplink control channel elements for transmitting target uplink control information. The multiple uplink control channel elements may be within the same target time unit in time domain and each of the multiple uplink control channel elements may be capable of independently transmitting the uplink control information.

The receiving module 520 may be configured to receive, in the target time, the target uplink control information transmitted by a terminal device unit through the multiple uplink control channel elements.

Alternatively, in some embodiments, a length of time-domain resources occupied by an uplink control channel element is equal to a length of time-domain resources occupied by a number A of OFDM symbols, and a length of frequency-domain resources occupied by the uplink control channel element is equal to a length of frequency-domain resources occupied by a number B of RBs, both of A and B being positive integers greater than or equal to 1.

Alternatively, in some embodiments, the network device 500 further includes a second determination module, configured to determine the length of the time-domain resources and/or frequency-domain resources occupied by the uplink control channel elements according to a rule specified by a protocol.

Alternatively, in some embodiments, the network device 500 further includes a third determination module, configured to configure the length of the time-domain resources and/or frequency-domain resources occupied by the uplink control channel elements according to signaling transmitted by the network device 500.

Alternatively, in some embodiments, the maximum bit number of uplink control information which can be transmitted by one uplink control channel element is N, and a value of N is set in one of the following manners: the value of N is set to be 2; the value of N is set to be equal to a preset maximum bit number of ACK/NACK information corresponding to downlink data transmitted in a time unit; and the value of N is configured by the network device 500.

Alternatively, in some embodiments, the first determination module 510 is specifically configured to transmit multiple pieces of downlink data to the terminal device, each of the multiple pieces of downlink data corresponding to independent ACK/NACK information, and the target uplink control information including the ACK/NACK information of the multiple pieces of downlink data. And the first determination module 510 is further configured to determine uplink control channel elements corresponding to the multiple pieces of downlink data respectively to obtain the multiple uplink control channel elements.

Alternatively, in some embodiments, each of the multiple pieces of downlink data corresponds to at least one of the multiple uplink control channel elements, each of the multiple uplink control channel elements being configured to transmit the ACK/NACK information of the downlink data corresponding to the uplink control channel element.

Alternatively, in some embodiments, the network device 500 further includes a fourth determination module, configured to determine a number of uplink control channel elements required for transmission of the target uplink control information according to the bit number of the target uplink control information and the maximum bit number of the uplink control information which can be transmitted by one uplink control channel element.

Alternatively, in some embodiments, the fourth determination module is specifically configured to determine the number of the uplink control channel elements required for transmission of the target uplink control information according to K·[M/N], where M represents the bit number of the target uplink control information, N represents the maximum bit number of the uplink control information which can be transmitted by one uplink control channel element and K is a positive integer greater than or equal to 1.

Alternatively, in some embodiments, the network device 500 further includes: a generation module, configured to generate indication information, the indication information including information for indicating the resources occupied by the multiple uplink control channel elements; and a transmitting module, configured to transmit the indication information to the terminal device.

Alternatively, in some embodiments, the indication information is DCI.

Alternatively, in some embodiments, the network device 500 further includes a fifth determination module, configured to determine a resource occupied by a first uplink control channel element in the multiple uplink control channel elements; and a sixth determination module, configured to determine resources occupied by the other uplink control channel elements, except the first uplink control channel element, in the multiple uplink control channel elements according to the resource occupied by the first uplink control channel element.

Alternatively, in some embodiments, the sixth determination module is specifically configured to determine serial numbers of the resources occupied by the other uplink control channel elements according to a serial number of the resource occupied by the first uplink control channel element, and determine the resources occupied by the other uplink control channel elements according to the serial numbers of the resources occupied by the other uplink control channel elements.

Alternatively, in some embodiments, the sixth determination module is specifically configured to determine the serial numbers of the resources occupied by the other uplink control channel elements according to the serial number of the resource occupied by the first uplink control channel element and a predefined function; or, determine the serial numbers of the resources occupied by the other uplink control channel elements according to the serial number of the resource occupied by the first uplink control channel element and a preset offset. Or, the sixth determination module is specifically configured to determine the serial numbers of the resources occupied by the other uplink control channel elements according to the serial number of the resource occupied by the first uplink control channel element and HARQ timing of the other downlink data, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the sixth determination module is specifically configured to determine the serial numbers of the resources occupied by the other uplink control channel elements according to the serial number of the resource occupied by the first uplink control channel element and sequence numbers of time units where the other downlink data are located and/or sequence numbers of carriers where the other downlink data are located, the multiple uplink control channel elements being configured to transmit the ACK/NACK information of the multiple pieces of downlink data respectively and the other downlink data being the downlink data, except the downlink data corresponding to the first uplink control channel element, in the multiple pieces of downlink data. Or, the sixth determination module is specifically configured to determine the serial numbers of the resources occupied by the other uplink control channel elements according to the serial number of the resource occupied by the first uplink control channel element and serial numbers of the other downlink data, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the sixth determination module is specifically configured to determine the serial numbers of the resources occupied by the other uplink control channel elements according to the serial number of the resource occupied by the first uplink control channel element and serial numbers of TBs or coding blocks carried in the other downlink data, the multiple uplink control channel elements being configured to transmit the ACK/NACK information of the multiple pieces of downlink data respectively, and the downlink data being the downlink data, except the downlink data corresponding to the first uplink control channel element, in the multiple pieces of downlink data.

Alternatively, in some embodiments, the resources occupied by the other uplink control channel elements are at least partially the same as the resource occupied by the first uplink control channel element.

Alternatively, in some embodiments, the fifth determination module is specifically configured to configure the resource occupied by the first uplink control channel element. Or, the fifth determination module is specifically configured to determine the resource occupied by the first uplink control channel element according to an RNTI of the terminal device or an ID of the terminal. Or, the fifth determination module is specifically configured to determine the resource occupied by the first uplink control channel element according to a serial number of a physical resource occupied by a downlink control channel corresponding to the first uplink control channel element.

Alternatively, in some embodiments, the resource occupied by an uplink control channel element includes at least one of a time-domain resource, a frequency-domain resource, or a code-domain resource.

Alternatively, in some embodiments, the multiple uplink control channel elements are used to repeatedly transmit the target uplink control information.

Alternatively, in some embodiments, the multiple uplink control channel elements are used together to transmit the target uplink control information, and different uplink control channel elements in the multiple uplink control channel elements are used to transmit different information in the target uplink control information.

Alternatively, in some embodiments, the time unit is a time slot.

Figure 6:
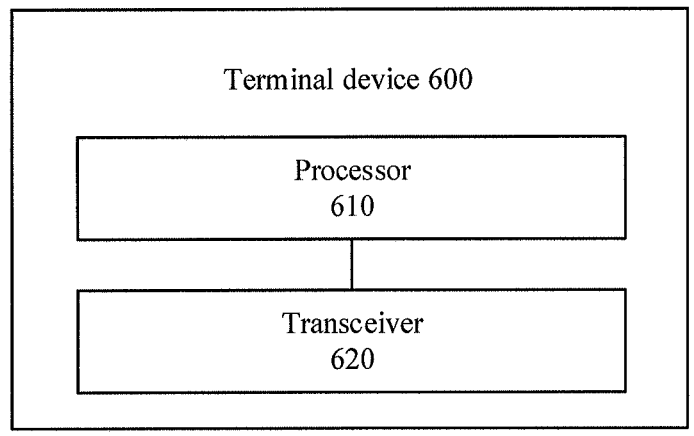
FIG. 6 is a schematic structure diagram of a terminal device according to an embodiment of the disclosure.

FIG. 6 is a schematic structure diagram of a terminal device according to an embodiment of the disclosure. The terminal device 600 illustrated in FIG. 6 includes a processor 610 and a transceiver 620.

The processor 610 may be configured to determine multiple uplink control channel elements for transmitting target uplink control information. The multiple uplink control channel elements may be within the same target time unit in time domain, and each of the multiple uplink control channel elements may be capable of independently transmitting the uplink control information.

The transceiver 620 may be configured to transmit, in the target time unit, the target uplink control information to a network device through the multiple uplink control channel elements.

Alternatively, in some embodiments, a length of time-domain resources occupied by an uplink control channel element is equal to a length of time-domain resources occupied by a number A of OFDM symbols, and a length of frequency-domain resources occupied by the uplink control channel element is equal to a length of frequency-domain resources occupied by a number B of RBs, both A and B being positive integers greater than or equal to 1.

Alternatively, in some embodiments, the processor 610 may specifically be configured to determine the length of the time-domain resources and/or frequency-domain resources occupied by the uplink control channel elements according to a rule specified by a protocol.

Alternatively, in some embodiments, the processor 610 may specifically be configured to determine the length of the time-domain resources and/or frequency-domain resources occupied by the uplink control channel elements according to signaling transmitted by the network device.

Alternatively, in some embodiments, the maximum bit number of uplink control information which can be transmitted by one uplink control channel element is N, and a value of N is set in one of the following manners: the value of N is set to be 2; the value of N is set to be equal to a preset maximum bit number of ACK/NACK information corresponding to downlink data transmitted in a time unit; and the value of N is configured by the network device.

Alternatively, in some embodiments, the transceiver 620 may specifically be configured to receive multiple pieces of downlink data, each of the multiple pieces of downlink data corresponding to independent ACK/NACK information, and the target uplink control information including the ACK/NACK information of the multiple pieces of downlink data. And the transceiver 620 is further configured to determine uplink control channel elements corresponding to the multiple pieces of downlink data respectively to obtain the multiple uplink control channel elements.

Alternatively, in some embodiments, each of the multiple pieces of downlink data corresponds to at least one of the multiple uplink control channel elements, each of the multiple uplink control channel elements being configured to transmit the ACK/NACK information of the downlink data corresponding to the uplink control channel element.

Alternatively, in some embodiments, the processor 610 may specifically be configured to determine a number of uplink control channel elements required for transmission of the target uplink control information according to the bit number of the target uplink control information and the maximum bit number of the uplink control information which can be transmitted by one uplink control channel element.

Alternatively, in some embodiments, the processor 610 may specifically be configured to determine the number of the uplink control channel elements required for transmission of the target uplink control information according to $K \cdot \lceil M/N \rceil$, where M represents the bit number of the target uplink control information, N represents the maximum bit number of the uplink control information which can be transmitted by one uplink control channel element, and K is a positive integer greater than or equal to 1.

Alternatively, in some embodiments, the transceiver 620 is further configured to receive indication information transmitted by the network device, the indication information including information for indicating the resources occupied by the multiple uplink control channel elements; and the processor 610 is further configured to determine the resources occupied by the multiple uplink control channel elements according to the indication information.

Alternatively, in some embodiments, the indication information is DCI.

Alternatively, in some embodiments, the processor 610 is further configured to determine a resource occupied by a first uplink control channel element in the multiple uplink control channel elements and determine resources occupied by the other uplink control channel elements, except the first uplink control channel element, in the multiple uplink control channel elements according to the resource occupied by the first uplink control channel element.

Alternatively, in some embodiments, the processor 610 may specifically be configured to determine serial numbers of the resources occupied by the other uplink control channel elements according to a serial number of the resource occupied by the first uplink control channel element and determine the resources occupied by the other uplink control channel elements according to the serial numbers of the resources occupied by the other uplink control channel elements.

Alternatively, in some embodiments, the processor 610 may specifically be configured to determine the serial numbers of the resources occupied by the other uplink control channel elements according to the serial number of the resource occupied by the first uplink control channel element and a predefined function. Or, the processor 610 may specifically be configured to determine the serial numbers of the resources occupied by the other uplink control channel elements according to the serial number of the resource occupied by the first uplink control channel element and a preset offset. Or, the processor 610 may specifically be configured to determine the serial numbers of the resources occupied by the other uplink control channel elements according to the serial number of the resource occupied by the first uplink control channel element and HARQ timing of the other downlink data, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the processor 610 may specifically be configured to determine the serial numbers of the resources occupied by the other uplink control channel elements according to the serial number of the resource occupied by the first uplink control channel element and sequence numbers of time units where the other downlink data are located and/or sequence numbers of carriers where the other downlink data are located, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the processor 610 may specifically be configured to determine the serial numbers of the resources occupied by the other uplink control channel elements according to the serial number of the resource occupied by the first uplink control channel element and serial numbers of the other downlink data, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the processor 610 may specifically be configured to determine the serial numbers of the resources occupied by the other uplink control channel elements according to the serial number of the resource occupied by the first uplink control channel element and serial numbers of TBs or coding blocks carried in the other downlink data, the multiple uplink control channel elements being configured to transmit the ACK/NACK information of the multiple pieces of downlink data respectively, and the downlink data being the downlink data, except the downlink data corresponding to the first uplink control channel element, in the multiple pieces of downlink data.

Alternatively, in some embodiments, the resources occupied by the other uplink control channel elements are at least partially the same as the resource occupied by the first uplink control channel element.

Alternatively, in some embodiments, the processor 610 may specifically be configured to determine the resource occupied by the first uplink control channel element according to the signaling transmitted by the network device. Or, the processor 610 may specifically be configured to determine the resource occupied by the first uplink control channel element according to an RNTI of the terminal device 600 or an ID of the terminal. Or, the processor 610 may specifically be configured to determine the resource occupied by the first uplink control channel element according to a serial number of a physical resource occupied by a downlink control channel corresponding to the first uplink control channel element.

Alternatively, in some embodiments, the resource occupied by an uplink control channel element includes at least one of a time-domain resource, a frequency-domain resource, or a code-domain resource.

Alternatively, in some embodiments, the multiple uplink control channel elements are used to repeatedly transmit the target uplink control information.

Alternatively, in some embodiments, the multiple uplink control channel elements are used together to transmit the target uplink control information, and different uplink control channel elements in the multiple uplink control channel elements are used to transmit different information in the target uplink control information.

Alternatively, in some embodiments, the time unit is a time slot.

Figure 7:
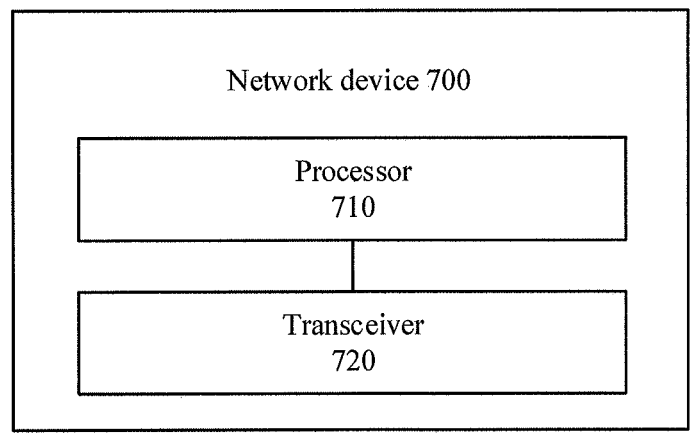
FIG. 7 is a schematic structure diagram of a network device according to an embodiment of the disclosure.

FIG. 7 is a schematic structure diagram of a network device according to an embodiment of the disclosure. The network device 700 illustrated in FIG. 7 includes a processor 710 and a transceiver 720.

The processor 710 may be configured to determine multiple uplink control channel elements for transmitting target uplink control information. The multiple uplink control channel elements may be within the same target time unit in time domain, and each of the multiple uplink control channel elements may be capable of independently transmitting the uplink control information.

The transceiver 720 may be configured to receive, in the target time unit, the target uplink control information transmitted by a terminal device through the multiple uplink control channel elements.

Alternatively, in some embodiments, a length of time-domain resources occupied by an uplink control channel element is equal to a length of time-domain resources occupied by a number A of OFDM symbols, and a length of frequency-domain resources occupied by the uplink control channel element is equal to a length of frequency-domain resources occupied by a number B of RBs, both A and B being positive integers greater than or equal to 1.

Alternatively, in some embodiments, the processor 710 is further configured to determine the length of the time-domain resources and/or frequency-domain resources occupied by the uplink control channel elements according to a rule specified by a protocol.

Alternatively, in some embodiments, the processor 710 is further configured to determine the length of the time-domain resources and/or frequency-domain resources occupied by the uplink control channel elements according to signaling transmitted by the network device 700.

Alternatively, in some embodiments, the maximum bit number of uplink control information which can be transmitted by one uplink control channel element is N, and a value of N is set in one of the following manners: the value of N is set to be 2; the value of N is set to be equal to a preset maximum bit number of ACK/NACK information corresponding to downlink data transmitted in a time unit; and the value of N is configured by the network device 700.

Alternatively, in some embodiments, the processor 710 may specifically be configured to transmit multiple pieces of downlink data to the terminal device, each of the multiple pieces of downlink data corresponding to independent ACK/NACK information and the target uplink control information including the ACK/NACK information of the multiple pieces of downlink data, and, for each of the multiple pieces of downlink data, determine one or more corresponding uplink control channel elements, to obtain the multiple uplink control channel elements.

Alternatively, in some embodiments, each of the multiple pieces of downlink data corresponds to at least one of the multiple uplink control channel elements, each of the multiple uplink control channel elements being configured to transmit the ACK/NACK information of the downlink data corresponding to the uplink control channel element.

Alternatively, in some embodiments, the processor 710 is further configured to determine a number of uplink control channel elements required for transmission of the target uplink control information according to the bit number of the target uplink control information and the maximum bit number of the uplink control information which can be transmitted by one uplink control channel element.

Alternatively, in some embodiments, the processor 710 may specifically be configured to determine the number of the uplink control channel elements required for transmission of the target uplink control information according to K·⌈M/N⌉, where M represents the bit number of the target uplink control information, N represents the maximum bit number of the uplink control information which can be transmitted by one uplink control channel element, and K is a positive integer greater than or equal to 1.

Alternatively, in some embodiments, the processor 710 is further configured to generate indication information, the indication information including information for indicating the resources occupied by the multiple uplink control channel elements; and a transmitting module may be configured to transmit the indication information to the terminal device.

Alternatively, in some embodiments, the indication information is DCI.

Alternatively, in some embodiments, the processor 710 may specifically be configured to determine a resource occupied by a first uplink control channel element in the multiple uplink control channel elements, and determine resources occupied by the other uplink control channel elements, except the first uplink control channel element, in the multiple uplink control channel elements according to the resource occupied by the first uplink control channel element.

Alternatively, in some embodiments, the processor 710 may specifically be configured to determine serial numbers of the resources occupied by the other uplink control channel elements according to a serial number of the resource occupied by the first uplink control channel element, and determine the resources occupied by the other uplink control channel elements according to the serial numbers of the resources occupied by the other uplink control channel elements.

Alternatively, in some embodiments, the processor 710 may specifically be configured to determine the serial numbers of the resources occupied by the other uplink control channel elements according to the serial number of the resource occupied by the first uplink control channel element and a predefined function. Or, the processor 710 may specifically be configured to determine the serial numbers of the resources occupied by the other uplink control channel elements according to the serial number of the resource occupied by the first uplink control channel element and a preset offset. Or, the processor 710 may specifically be configured to determine the serial numbers of the resources occupied by the other uplink control channel elements according to the serial number of the resource occupied by the first uplink control channel element and HARQ timing of the other downlink data, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the processor 710 may specifically be configured to determine the serial numbers of the resources occupied by the other uplink control channel elements according to the serial number of the resource occupied by the first uplink control channel element and sequence numbers of time units where the other downlink data are located and/or sequence numbers of carriers where the other downlink data are located, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the processor 710 may specifically be configured to determine the serial numbers of the resources occupied by the other uplink control channel elements according to the serial number of the resource occupied by the first uplink control channel element and serial numbers of the other downlink data, the multiple uplink control channel elements being configured to transmit the ACK/NACK information of the multiple pieces of downlink data respectively, and the other downlink data being the downlink data, except the downlink data corresponding to the first uplink control channel element, in the multiple pieces of downlink data. Or, the processor 710 may specifically be configured to determine the serial numbers of the resources occupied by the other uplink control channel elements according to the serial number of the resource occupied by the first uplink control channel element and serial numbers of TBs or coding blocks carried in the other downlink data, the multiple uplink control channel elements being configured to transmit the ACK/NACK information of the multiple pieces of downlink data respectively, and the downlink data being the downlink data, except the downlink data corresponding to the first uplink control channel element, in the multiple pieces of downlink data.

Alternatively, in some embodiments, the resources occupied by the other uplink control channel elements are at least partially the same as the resource occupied by the first uplink control channel element.

Alternatively, in some embodiments, the processor 710 may specifically be configured to configure the resource occupied by the first uplink control channel element. Or, the processor 710 may specifically be configured to determine the resource occupied by the first uplink control channel element according to an RNTI of the terminal device or an ID of the terminal. Or, the processor 710 may specifically be configured to determine the resource occupied by the first uplink control channel element according to a serial number of a physical resource occupied by a downlink control channel corresponding to the first uplink control channel element.

Alternatively, in some embodiments, the resource occupied by an uplink control channel element includes at least one of a time-domain resource, a frequency-domain resource, or a code-domain resource.

Alternatively, in some embodiments, the multiple uplink control channel elements are used to repeatedly transmit the target uplink control information.

Alternatively, in some embodiments, the multiple uplink control channel elements are used together to transmit the target uplink control information, and different uplink control channel elements in the multiple uplink control channel elements are used to transmit different information in the target uplink control information.

Alternatively, in some embodiments, the time unit is a time slot.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the actions of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The invention claimed is:

1. A method for uplink control information transmission, comprising:
   determining, by a terminal device, multiple uplink control channel elements for transmitting target uplink control information, wherein the multiple uplink control channel elements are within a same target time slot in time domain, and each of the multiple uplink control channel elements is capable of independently transmitting the uplink control information; and
   transmitting, by the terminal device, in the target time slot, the same target uplink control information to a network device through each of the multiple uplink control channel elements;
   wherein the uplink control channel elements are resource elements configured to carry the uplink control information;
   wherein the method further comprises:
   determining, by the terminal device, a resource occupied by a first uplink control channel element in the multiple uplink control channel elements; and
   determining, by the terminal device, resources occupied by the other uplink control channel elements, except the first uplink control channel element, in the multiple uplink control channel elements according to the resource occupied by the first uplink control channel element.

2. The method of claim 1, wherein a length of time-domain resources occupied by each of the uplink control channel elements is equal to a length of time-domain resources occupied by a number A of Orthogonal Frequency Division Multiplexing (OFDM) symbols, and a length of frequency-domain resources occupied by the uplink control channel element is equal to a length of frequency-domain resources occupied by a number B of Resource Blocks (RBs), both A and B being positive integers greater than or equal to 1.

3. The method of claim 1, further comprising:
   determining, by the terminal device, at least one of a length of the time-domain resource or a length of the frequency-domain resources occupied by the uplink control channel elements according to signaling transmitted by the network device.

4. The method of claim 1, wherein the maximum bit number of the uplink control information which can be transmitted by one uplink control channel element is N, and a value of N is set in one of the following manners:
   the value of N is set to be 2;
   the value of N is set to be equal to a preset maximum bit number of Acknowledgment (ACK)/Negative Acknowledgment (NACK) information corresponding to downlink data transmitted in the time slot; and
   the value of N is configured by the network device.

5. The method of claim 1, wherein determining, by the terminal device, the multiple uplink control channel elements for transmitting the target uplink control information comprises:
   receiving, by the terminal device, multiple pieces of downlink data, each of the multiple pieces of downlink data corresponding to independent ACK/NACK information, and the target uplink control information comprising the ACK/NACK information of the multiple pieces of downlink data; and
   determining, by the terminal device, for each of the multiple pieces of downlink data, one or more corresponding uplink control channel elements, to obtain the multiple uplink control channel elements.

6. The method of claim 5, wherein each of the multiple pieces of downlink data corresponds to at least one of the multiple uplink control channel elements; and
   each of the multiple uplink control channel elements is configured to transmit the ACK/NACK information of the downlink data corresponding to the uplink control channel element.

7. The method of claim 1, further comprising:
   receiving, by the terminal device, indication information transmitted by the network device, the indication information comprising information for determining resources occupied by the multiple uplink control channel elements; and
   determining, by the terminal device, the resources occupied by the multiple uplink control channel elements according to the indication information.

8. The method of claim 7, wherein the indication information is Downlink Control Information (DCI).

9. The method of claim 7, wherein the resource occupied by an uplink control channel element comprises at least one of a time-domain resource, a frequency-domain resource, or a code-domain resource.

10. The method of claim 1, wherein the resources occupied by the other uplink control channel elements are at least partially the same as the resource occupied by the first uplink control channel element.

11. The method of claim 1, wherein the multiple uplink control channel elements are used together to transmit the target uplink control information, and different uplink control channel elements in the multiple uplink control channel elements are used to transmit different information in the target uplink control information.

12. A terminal device, comprising:
   a processor, configured to determine multiple uplink control channel elements for transmitting target uplink control information, wherein the multiple uplink control channel elements are within a same target time slot in time domain, and each of the multiple uplink control channel elements is capable of independently transmitting the uplink control information; and a transceiver, configured to transmit, in the target time slot, the same target uplink control information to a network device through each of the multiple uplink control channel elements;

wherein the uplink control channel elements are resource elements configured to carry the uplink control information;

wherein the processor is further configured to determine a resource occupied by a first uplink control channel element in the multiple uplink control channel elements; and wherein the processor is further configured to determine resources occupied by the other uplink control channel elements, except the first uplink control channel element, in the multiple uplink control channel elements according to the resource occupied by the first uplink control channel element.

13. The terminal device of claim 12, wherein a length of time-domain resources occupied by each of the uplink control channel elements is equal to a length of time-domain resources occupied by a number A of Orthogonal Frequency Division Multiplexing (OFDM) symbols, and a length of frequency-domain resources occupied by the uplink control channel element is equal to a length of frequency-domain resources occupied by A number B of Resource Blocks (RBs), both of A and B being positive integers greater than or equal to 1.

14. The terminal device of claim 12, wherein the processor is configured to determine at least one of a length of the time-domain resource or a length of the frequency-domain resources occupied by the uplink control channel elements.

15. The terminal device of claim 12, wherein the maximum bit number of the uplink control information which can be transmitted by one uplink control channel element is N, and a value of N is set in one of the following manners:
   setting the value of N to be 2;
   the value of N is set to be equal to a preset maximum bit number of Acknowledgment (ACK)/Negative Acknowledgment (NACK) information corresponding to downlink data transmitted in the time slot; and
   the value of N is configured by the network device.

16. The terminal device of claim 12, wherein the processor is configured to:
   receive multiple pieces of downlink data, each of the multiple pieces of downlink data corresponding to independent ACK/NACK information, and the target uplink control information comprising the ACK/NACK information of the multiple pieces of downlink data, and
   for each of the multiple pieces of downlink data, determine one or more corresponding uplink control channel elements, to obtain the multiple uplink control channel elements.

17. The terminal device of claim 16, wherein each of the multiple pieces of downlink data corresponds to at least one of the multiple uplink control channel elements; and
   each of the multiple uplink control channel elements is configured to transmit the ACK/NACK information of the downlink data corresponding to the uplink control channel element.

18. The terminal device of claim 12,
   wherein the transceiver is further configured to receive indication information transmitted by the network device, the indication information comprising information for determining resources occupied by the multiple uplink control channel elements; and
   wherein the processor is further configured to determine the resources occupied by the multiple uplink control channel elements according to the indication information.

19. The terminal device of claim 18, wherein the indication information is Downlink Control Information (DCI).

20. The terminal device of claim 18, wherein the resource occupied by an uplink control channel element comprises at least one of a time-domain resource, a frequency-domain resource, or a code-domain resource.

21. The terminal device of claim 12, wherein the resources occupied by the other uplink control channel elements are at least partially the same as the resource occupied by the first uplink control channel element.

22. The terminal device of claim 12, wherein the multiple uplink control channel elements are used together to transmit the target uplink control information, and different uplink control channel elements in the multiple uplink control channel elements are used to transmit different information in the target uplink control information.

* * * * *